United States Patent
Thellefsen et al.

(10) Patent No.: US 10,532,930 B2
(45) Date of Patent: Jan. 14, 2020

(54) METHOD FOR PRODUCTION OF SULFURIC ACID FROM SULFUR CONTAINING FEEDS WITH GAS QUENCHING

(71) Applicant: Haldor Topsøe A/S, Kgs. Lyngby (DK)

(72) Inventors: Morten Thellefsen, Hillerød (DK); Martin Møllerhøj, Birkerød (DK)

(73) Assignee: Haldor Topsoe A/S, Lyngby (DK)

(*) Notice: Subject to any disclaimer, the term of this patent is extended or adjusted under 35 U.S.C. 154(b) by 0 days.

(21) Appl. No.: 16/309,305

(22) PCT Filed: Jul. 4, 2017

(86) PCT No.: PCT/EP2017/066593
§ 371 (c)(1),
(2) Date: Dec. 12, 2018

(87) PCT Pub. No.: WO2018/015138
PCT Pub. Date: Jan. 25, 2018

(65) Prior Publication Data
US 2019/0308879 A1 Oct. 10, 2019

(30) Foreign Application Priority Data
Jul. 21, 2016 (DK) .................. 2016 00440

(51) Int. Cl.
*B01D 53/14* (2006.01)
*C01B 17/50* (2006.01)
*C01B 17/74* (2006.01)
*C01B 17/92* (2006.01)

(52) U.S. Cl.
CPC .......... *C01B 17/92* (2013.01); *B01D 53/1468* (2013.01); *C01B 17/503* (2013.01); *C01B 17/508* (2013.01); *C01B 17/74* (2013.01)

(58) Field of Classification Search
CPC ......... C01B 17/69; C01B 17/74; C01B 17/76; C01B 17/765; C01B 17/80; C01B 17/901; B01D 53/002; B01D 53/50; B01D 53/64; B01D 53/74; B01D 53/75; B01D 53/8609; B01D 2202/00; B01D 2257/302; B01D 2257/60
See application file for complete search history.

(56) References Cited

U.S. PATENT DOCUMENTS 3,684,440 A * 8/1972 Stauffer .................. C01B 17/76
423/522
3,957,951 A 5/1976 Hokanson et al.
(Continued)

FOREIGN PATENT DOCUMENTS

DE 1258846 B 1/1968
DE 1667642 A1 1/1972
(Continued)

*Primary Examiner* — Timothy C Vanoy
(74) *Attorney, Agent, or Firm* — Blank Rome LLP

(57) ABSTRACT

A plant for the production of sulfur trioxide from a feed stream containing sulfur-containing compounds and dissolved metals and alkali metals by a process, which involves gas quenching, comprises an incineration furnace, a mixing device and/or a dilution air heater, a dust removal device and an $SO_2$ converter. The plant may further comprise a condenser for the purpose of producing sulfuric acid.

14 Claims, 6 Drawing Sheets

(56) References Cited

U.S. PATENT DOCUMENTS

Figure 1:
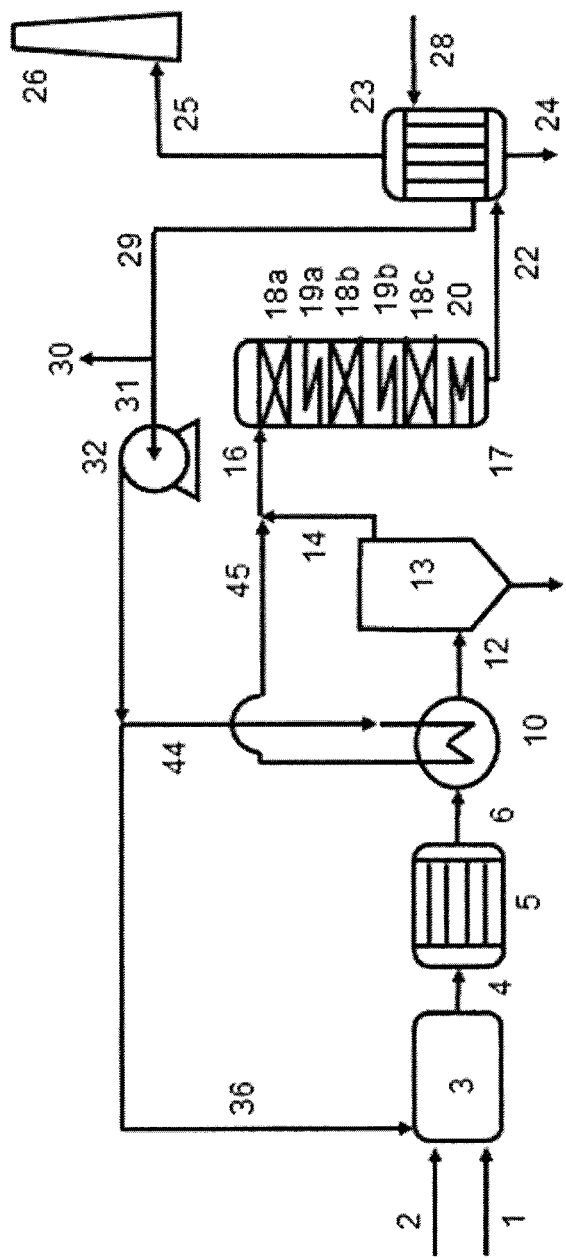

| | | | | |
|---|---|---|---|---|
| 4,014,981 A | * | 3/1977 | Wainer | B01D 53/50 |
| | | | | 423/506 |
| 4,454,100 A | * | 6/1984 | Faatz | B01D 53/34 |
| | | | | 423/210 |
| 4,578,262 A | | 3/1986 | Cameron | |
| 5,061,472 A | * | 10/1991 | Lailach | C01B 17/901 |
| | | | | 159/47.1 |
| 5,082,645 A | * | 1/1992 | Al-Samadi | C01B 17/76 |
| | | | | 423/403 |
| 5,791,268 A | * | 8/1998 | Battles | B01D 53/8609 |
| | | | | 110/215 |

FOREIGN PATENT DOCUMENTS

| | | | |
|---|---|---|---|
| DK | 115763 | B | 11/1969 |
| EP | 0218411 | A1 | 4/1987 |
| EP | 0516001 | A1 | 12/1992 |
| EP | 2942323 | A1 | 11/2015 |

* cited by examiner

METHOD FOR PRODUCTION OF SULFURIC ACID FROM SULFUR CONTAINING FEEDS WITH GAS QUENCHING

The present invention relates to a method for production of sulfuric acid from sulfur containing feeds with high potential for formation of so-called sticky dust that can plug conventional waste heat boilers, forcing unplanned shut downs of the entire sulfuric acid plant.

More specifically, the invention relates to a method for the production of sulfur trioxide from a feed stream comprising sulfur-containing compounds and dissolved metals and alkali metals, said process comprising the following steps:

incineration in the presence of an $O_2$-rich stream and optionally a support fuel, whereby the sulfur-containing compounds in the feed stream are converted to $SO_2$ and the dissolved metals and alkali metals are converted into a partly solidified dust, mixing the hot process gas from the incinerator with a stream of colder gas in a mixing unit, such that the temperature of the combined stream is below the particle solidification temperature, cooling of the combined gas stream in one or two heat exchangers, removing solid dust particles from the combined gas stream in a dust removal device, optionally adding hot dilution air to the process gas to provide sufficient oxygen for the oxidation of $SO_2$ to $SO_3$ in an $SO_2$ converter, and feeding the process gas to an $SO_2$ converter consisting of a number of catalyst layers with heat exchangers installed between the catalyst layers, thereby converting the $SO_2$ in the process gas to $SO_3$.

The sulfur containing feed could be spent sulfuric acid from an alkylation process, in which sulfuric acid is acting as catalyst for the production of alkylate—i.e. a fuel additive. In the alkylation process, the sulfuric acid gets contaminated with water and acid soluble oils and, to some extent, also corrosion products from the plant equipment (Fe, Cr, Ni ions) and ingress of alkaline (Na, K) ions, e.g. from alkylate purifying equipment. This acid is withdrawn from the alkylation process, regenerated to concentrated sulfuric acid in a separate sulfuric acid plant and returned to the alkylation process.

Another example of a sulfur containing feed is the products from a coke oven gas cleaning process, in which $H_2S$ and HCN present in the coke oven gas are absorbed into an aqueous alkaline solution and converted into elemental sulfur (S) and salts of $SCN^-$, $S_2O_3^{2-}$ and $SO_4^{2-}$. Usually the corresponding cation is $NH_4^+$ or $Na_+$, depending on how the alkalinity is controlled, e.g. by $NH_3$ or NaOH addition. The trade names for such coke oven gas cleaning processes are e.g. HPF, PDS, Perox and Stretford. These products are of low quality and value and can be converted into concentrated sulfuric acid to increase the utilization and value of the sulfur compounds.

The relevant prior art is described in applicant's EP 2 942 323 A1 disclosing a method for the production of $SO_3$ from a feed stream generated from desulfurization of coke gas comprising dissolved metals. The stream is fed to an incinerator together with a support fuel and an $O_2$-containing stream, whereby elemental sulfur is oxidized to $SO_2$. The stream from the incinerator is fed to a waste heat boiler and then passed through a filter device. Then the stream is directed to an $SO_2$ oxidation reactor for production of $SO_3$, which is then converted to sulfuric acid.

The method of the present invention differs from the above prior art in that it comprises a step of mixing the hot process gas from the incinerator with a stream of colder gas in a mixing unit, such that the temperature of the combined stream is below the particle solidification temperature. Thus, the method of the present invention provides an improved way of producing $SO_3$ from feed streams comprising sulfur-containing compounds and dissolved metals, where the metals are removed as solids after cooling.

Figure 2:
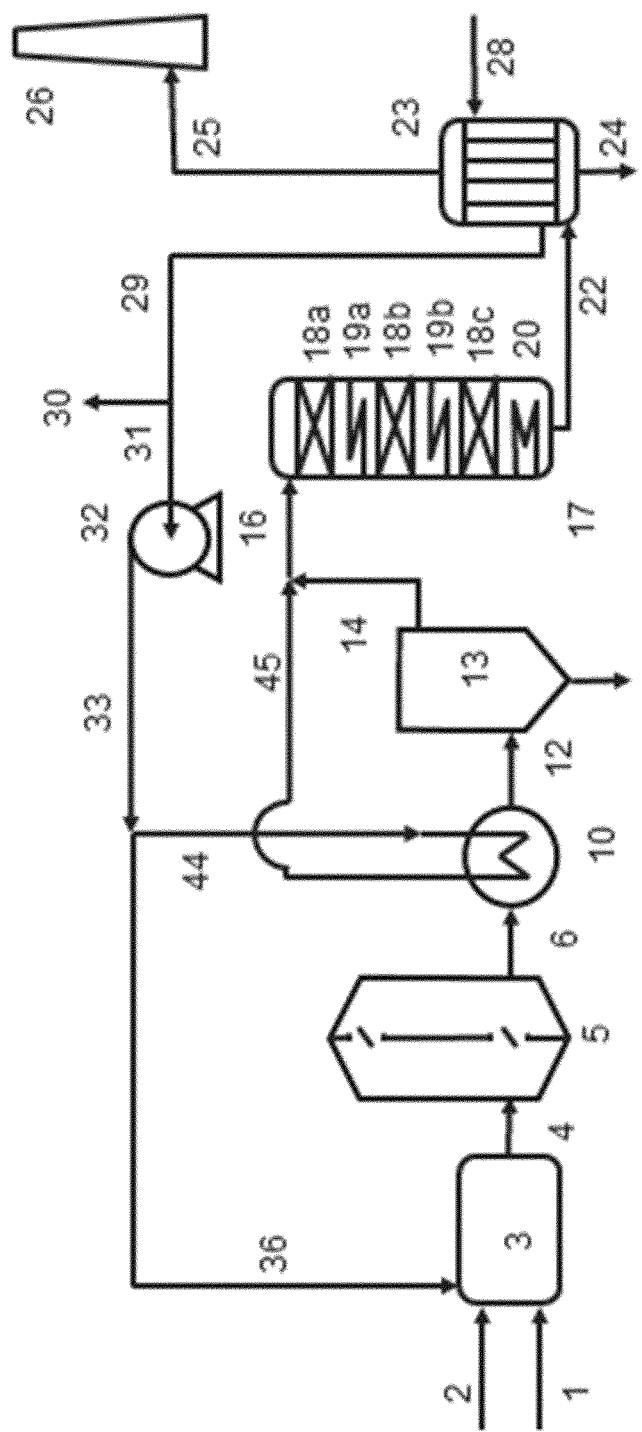

In the following, the invention is described in more detail with reference to the Figures, where FIG. 1 is a known process layout for converting a feed stream into concentrated sulfuric acid, FIG. 2 shows the sulfuric acid process with a new type of waste heat boiler to be used according to the invention, and FIGS. 3 to 6 show different alternative process layouts to be used according to the invention.

The commonly used process layout for converting sulfur-containing feeds into concentrated sulfuric acid is shown in FIG. 1.

In the first step, the feed stream comprising sulfur compounds and dissolved metals and alkali metals 1 is fed into a furnace 3, operating at 900-1100° C. In the furnace, the following reactions take place, depending on the exact composition of the feed:

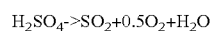
$H_2SO_4 \rightarrow SO_2 + 0.5O_2 + H_2O$

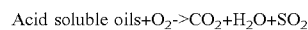
Acid soluble oils $+ O_2 \rightarrow CO_2 + H_2O + SO_2$

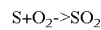
$S + O_2 \rightarrow SO_2$

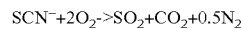
$SCN^- + 2O_2 \rightarrow SO_2 + CO_2 + 0.5N_2$

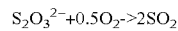
$S_2O_3^{2-} + 0.5O_2 \rightarrow 2SO_2$

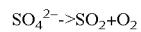
$SO_4^{2-} \rightarrow SO_2 + O_2$

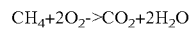
$CH_4 + 2O_2 \rightarrow CO_2 + 2H_2O$

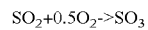
$SO_2 + 0.5O_2 \rightarrow SO_3$

To maintain the high temperature in the furnace, it will often be necessary to provide support fuel 2 to ensure a sufficiently high heating value of the feeds. Such support fuels can be $CH_4$, $C_2H_6$ and other hydrocarbon based fuels, but also $H_2S$, CO and $H_2$ are applicable.

To provide sufficient $O_2$ for the oxidation reactions described above, an $O_2$-rich stream 36 is directed to the furnace. Most often atmospheric air is used, because hot air 29 is produced in the sulfuric acid condenser 23 in the sulfuric acid plant.

In some applications it can be beneficial to use enriched $O_2$ (i.e. >21 vol %), but usually the cost of $O_2$ enrichment turns out to be higher than the benefit from the higher $O_2$ concentration.

The process gas 4 leaving the furnace 3 is cooled to 450-600° C. in a waste heat boiler 5 in order to recover heat in the form of high pressure steam. The steam pressure is in the range 20-85 bar gauge.

The most common type of waste heat boiler for these applications is the so-called fire tube boilers, in which the process gas flows through a number of parallel horizontal tubes. The gas velocity is high (usually 25-50 m/sec) to provide a high convective heat transfer coefficient for efficient heat transfer to the cooling media on the shell side of the tubes. The cooling media is usually high pressure water, and heat is absorbed by means of phase transfer (i.e. boiling). This design is well known and widely used in the industry.

Another type of waste heat boiler is the so-called water tube boiler, in which the process gas flows on the shell side of the tubes and water/steam is flowing on the inside of the tubes. Water tube boilers also rely on convective heat transfer, and thus the gas velocity must be high and the distance between the tubes must be small.

The process gas 6 leaving the waste heat boiler is then further cooled to 375-450° C. in a dilution air heater 10. If there is no need for air dilution, a steam superheater could be installed or the upstream waste heat boiler 5 could be designed to cool the process gas to 375-450° C. To protect downstream equipment, dust is removed from the process gas in an electrostatic precipitator 13. Other types of dust removal equipment can also be used, such as ceramic filters.

After dust removal, hot dilution air 45 is added to the process gas 14 in order to provide sufficient oxygen for the catalytic oxidation of $SO_2$ to $SO_3$. This position for air addition ensures that the size of the furnace 3, the waste heat boiler 5, the dilution air heater 10 and the electrostatic precipitator 13 is minimized.

The diluted process gas 16 then enters the $SO_2$ converter 17 at 375-420° C. The converter consists of a number of catalyst layers 18 with heat exchangers 19 installed between the catalyst layers. The conversion of $SO_2$ to $SO_3$ is an exothermal reaction, and in order to maximize the overall $SO_2$ conversion it is normal practice to use a number of catalyst layers, each consecutive layer operating at a lower temperature, to ensure the highest conversion efficiency possible. The number of catalyst layers is between 1 and 4, with 3 as the most common number for these applications.

The heat exchangers 19 between the catalyst layers are designed to provide the optimal process gas temperature at the inlet of each of the catalyst layers 18. As cooling media, usually saturated and/or superheated steam is used, but air, molten salt or hot pressurized water can be used too.

After the final catalyst layer 18c, the converted process gas is cooled to 250-310° C. in a boiler 20 before the process gas leaves the $SO_2$ converter 17. In this temperature range, the $SO_3$ starts to react with $H_2O$ in the gas phase to form $H_2SO_4$ vapor.

This reaction proceeds to completion in the sulfuric acid condenser 23 in which the process gas is cooled to 60-200° C. The majority of the sulfuric acid vapor condenses and liquid concentrated $H_2SO_4$ 24 is withdrawn from the bottom of the condenser, and a cleaned gas 25 leaves at the top of the condenser. Depending of the environmental legislation, the cleaned gas may require further cleaning steps before being emitted to the atmosphere via a stack 26.

The $H_2SO_4$ product 24 is cooled to around 40° C. and sent to battery limit for storage or direct use. The $H_2SO_4$ concentration is 93-98.5% w/w, depending on the $H_2O/SO_3$ ratio in the process gas 22.

The cooling media 28 for the sulfuric acid condensation is atmospheric air, and the hot air 29 leaving the condenser can be recycled back to the front end of the sulfuric acid plant as pre-heated combustion air 36 and hot dilution air 44. A hot air blower 32 is needed to recycle the hot air. Any hot air not used for these purposes 30 can be mixed with the cleaned gas 25 to provide a dry clean gas (and thus dry stack), or the heat can be utilized for e.g. boiler feed water pre-heating or other heating/drying purposes.

In the sulfuric acid condenser 23, glass tubes are used for separating the process gas from the cooling air, because metals are not able to withstand the corrosive nature of the hot concentrated sulfuric acid.

The so-called dry gas sulfuric acid technology has a different layout. The furnace and waste heat boiler are similar to those used in the wet gas technology as described above and shown in FIG. 1, but after leaving the waste heat boiler, the process gas is quenched to 50-60° C. to wash out dust and remove water from the process gas. The remaining water in the process gas is removed in a drying tower, using concentrated sulfuric acid as the drying agent. The cold dry $SO_2$-containing process gas is then reheated, $SO_2$ is catalytically oxidized to $SO_3$ and the formed $SO_3$ is absorbed into concentrated sulfuric acid in a dedicated absorption tower.

Both the wet and dry processes are able to convert the above mentioned feeds, as long as the concentrations of the dust forming metals and alkali metals are sufficiently low. If the tolerance for these impurities is exceeded, both processes will suffer from the effect of dust formation and deposition.

In the furnace 3 the dissolved metals and alkali metals in the feed will form oxides and/or sulfates in either solid or liquid state. The temperature and chemistry of the particles determine, to which extent the particles will be liquid. These particles will be transported out of the furnace together with the process gas 4. It is well known in the industry that high concentrations of Na and K will result in the formation of $Na_2SO_4/K_2SO_4$ compounds, which will be at least partly liquefied at the high furnace temperatures. When these "sticky" particles get into contact with the cold surfaces of the waste heat boiler 5, the particles will stick to the surface and quickly solidify to form a solid deposit layer. The thickness of the deposit layer grows over time, and eventually the layer will become so thick that the process gas flow through the waste heat boiler tube (in a fire tube boiler) or between the waste heat boiler tubes (in a water tube boiler) is hampered to a degree where it is not possible to operate the plant, and so the plant has to be shut down for removal of these deposits.

The operating time between such shut-downs can be more than a year for very clean feeds, but for feeds with very high concentrations of especially alkali metals, the tubes can plug after less than 24 hours of operation.

To some extent it is possible to prolong the time between shut downs by adding "anti-sticking" compounds, such as MgO and $Al_2(SO_4)_3$, to the feed streams and/or by carrying out some sort of on-line cleaning of the waste heat boiler. Such systems could be e.g. soot blowers, air blasters, mechanical cleaning and sonic horns. Due to the mechanical layout of the waste heat boilers with long tubes having a small diameter (fire tube boiler) or tube banks of small distance between the tubes (fire tube boiler), the efficiency of these cleaning systems is low.

For feeds with very high concentrations of alkali metals, it is also possible or necessary to sacrifice the heat recovery by carrying out a water quench of the process gas from around 1000° C. directly down to around 5° C. In this process, the sticky dust is dissolved in water and taken out with the waste water, but this process suffers from very low energy efficiency, high water consumption and large volumes of waste water.

Radiation-type heat exchangers are also available, and they are plugging resistant as the distance from metal surface to metal surface is large and the heat transfer length for radiation is much longer than for convective heat transfer. The radiation-type heat exchangers can either be of the gas/gas or the gas/steam type, of which the former is only used for small capacities whereas the latter is used for larger capacities, e.g. for power plant boilers. This layout is also shown in FIG. 2 and, apart from the new type of waste heat boiler in position 5, the process gas layout is the same as the conventional layout as shown in FIG. 1.

The plugging tendency of the dust particles in the process gas depends on their "stickiness", i.e. they must be at least partly liquefied to become sticky. At temperatures below this liquidification/solidification temperature, the dust particles will solidify and become non-sticky. The solidification temperature depends on the chemical composition of the particles and to some extent on the chemical composition of the surrounding process gas. As a rule of thumb, one can assume that the dust becomes non-sticky at a temperature below around 600° C., when the dust stickiness can be attributed to the presence of $Na_2SO_4$ and $K_2SO_4$ in the dust particles.

The present invention describes a process in which the dust particles in the process gas are cooled from the high temperature at the outlet of the furnace to a temperature below the solidification temperature without being exposed to cold surfaces on which the particles can deposit, solidify and build up a deposit layer.

The process gas cooling is carried out by mixing the hot process gas from the furnace with a stream of colder gas, such that the temperature of the combined stream is below the particle solidification temperature. After the mixing, the process gas can be exposed to cold heat exchange surfaces without risking any deposit layer build-up due to particle solidification. The cold stream could e.g. be atmospheric air, hot atmospheric air and/or recycled process gas.

Ordinary deposit formation by e.g. diffusion and settling in recirculation and low velocity zones cannot be avoided, but since the dust is loose, it will be easy to remove by mechanical means, such as soot blowers, air blasters and sonic horns.

Figure 3:
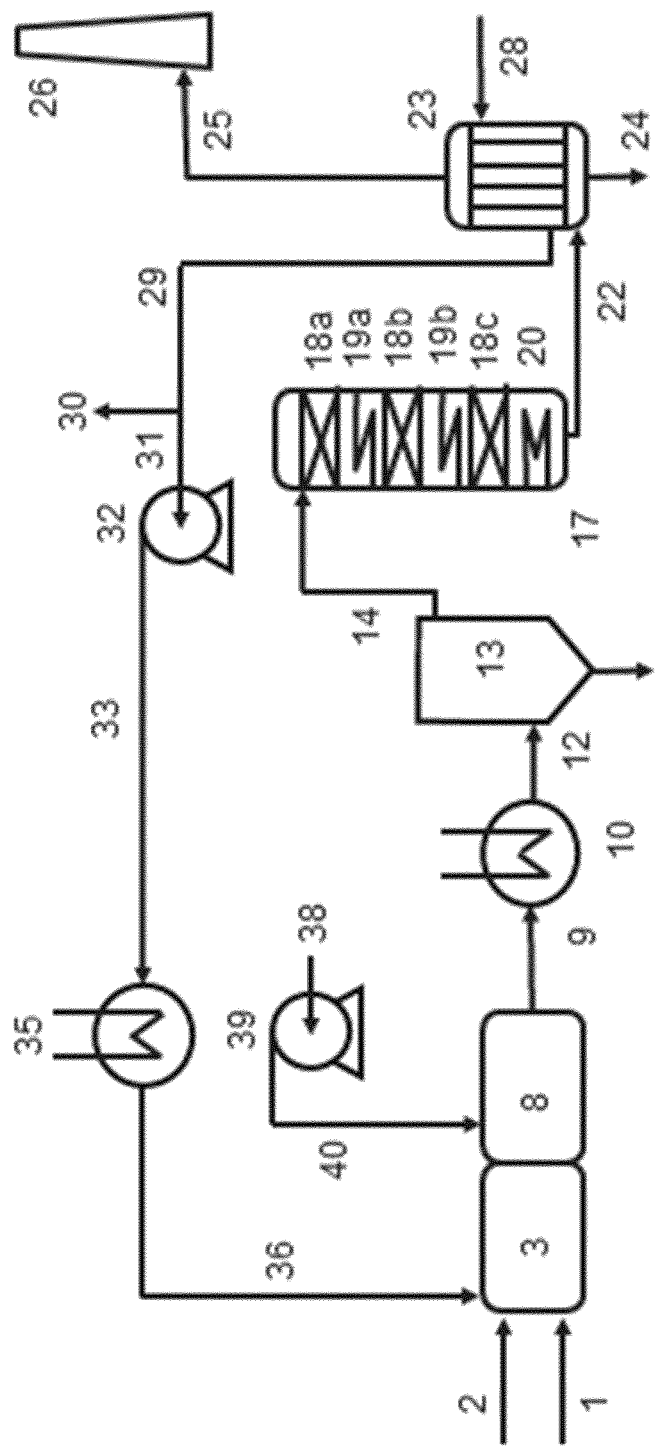

One such process layout of a sulfuric acid plant, treating a sulfur containing feed with high concentrations of dissolved metals and alkali metals, is shown in FIG. 3.

The sulfur containing feed 1 is fed into the furnace 3, operating at around 1000° C. At this temperature, sulfur compounds and hydrocarbons as well as any $NH_4+$ salts are converted into $SO_2$, $CO_2$, $H_2O$, $N_2$ and small amounts of $NO/NO_2$ and $SO_3$. Most often the feed stream does not have a sufficiently high heating value to sustain the high temperature in the furnace, and thus support fuel 2 is needed. Oxygen for the combustion processes is supplied via line 36, which is preheated air from the sulfuric acid condenser 23 and combustion air heater 35. The combustion air heater 35 is optional, but has the advantage of reducing the support fuel consumption. The combustion air leaving the sulfuric acid condenser 23 has a temperature of 200-260° C. and can be heated up to 450° C. in the combustion air heater 35.

The process gas leaving the furnace 3 is exactly as described for the conventional layout. The hot process gas is then mixed with cold atmospheric air 38, which has been pressurized in a cold air blower 39 before admitted via line 40 to the mixing chamber 8. There are numerous ways of mixing these two streams, e.g. adding the cold air via a number of nozzles located in a "ring" arrangement, covering the periphery of the mixing chamber or blowing in the air via a number of nozzles in a tangential arrangement, such that the cold air makes a swirl around the hot process gas. Static mixers could also be installed downstream the mixing point, but care should be taken to ensure that the surfaces of the mixer material are not below the solidification temperature of the dust particles. Otherwise the surfaces of the mixer should be kept separated from the dust laden process gas. The mixing chamber could be as simple as a brick lined chamber, just extending the brick lined furnace chamber 3.

The well-mixed process gas 9 leaving the mixing chamber 8 is around 450-500° C., and thus the dust particles are non-sticky. The process gas 9 is then cooled to 400-450° C. in a heat exchanger 10, which can be a waste heat boiler (water tube or fire tube) or the combustion air preheater 35.

The cooled process gas then enters the electrostatic precipitator 13, in which the dust is separated from the process gas and withdrawn from the bottom of the precipitator. The cleaned process gas 14 then enters the $SO_2$ converter 17. The following $SO_2$ conversion and sulfuric acid condensation is exactly as described in the conventional layout.

This simple process gas layout has a high resistance against fouling as only a single heat exchanger is in contact with the dust laden process gas, i.e. the availability of the plant is very high.

The drawback of the layout is that the process gas flow through the process gas cooler 10 and electrostatic precipitator 13 is high, and thus the equipment size and cost will increase.

Another drawback is that there is a small risk of sulfuric acid condensation in the mixing zone as it is possible to imagine that there can be surfaces in contact with the cold air (at say 20-60° C.) that also can get into contact with the process gas containing a little $SO_3$, which can condense as sulfuric acid at temperatures below roughly 200° C. A proper design of the gas/air mixing chamber will eliminate this risk.

Figure 4:
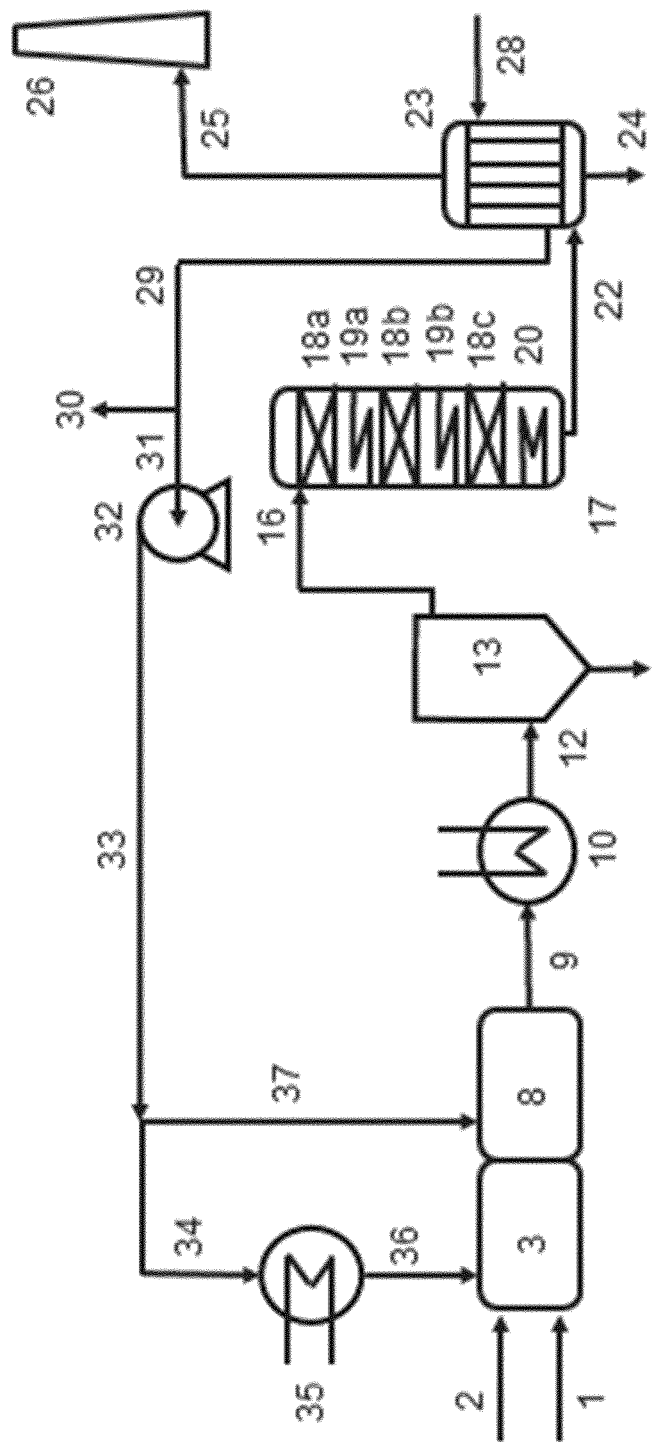

Another process layout is shown in FIG. 4. The difference from the layout in FIG. 3 is that the quench air 37 is hot air 29 from the sulfuric acid condensation tower 17. The hot air is pressurized in a combustion air blower 32. With this layout, the requirements for $O_2$ for the $SO_2$ oxidation in the converter 17 is fulfilled with a temperature when leaving the mixing chamber 8 of 600° C., i.e. the hot air temperature corresponds very well to the $O_2$ demand required. In FIG. 3, the quench air 40 was "too cold" to ensure the 600° C. mixing temperature when taking the $O_2$ demand into account, and the resulting process gas temperature was 450-500° C. For a quench air temperature of 400° C., the required air flow for cooling would be much higher than the demand for $O_2$ in the converter 17, and the downstream plant would have to be designed for a higher process gas flow. The optimum trade-off between $O_2$ demand and cooling requirements will depend on the composition of the feed 1 to the furnace 3 and the operation of the furnace.

In the layout shown in FIG. 4, more heat has to be removed in the process gas cooler 10, which could be one single heat exchanger or two or more heat exchangers in series. An example could be the combustion air heater 35 combined with a waste heat boiler to control the temperature of the process gas entering the electrostatic precipitator 13. This layout is just as simple as that shown in FIG. 3. The advantage is a better heat recovery, and the design of the mixing chamber becomes simpler, because all parts of the mixer will have a temperature above the sulfuric acid dew point temperature.

Figure 5:
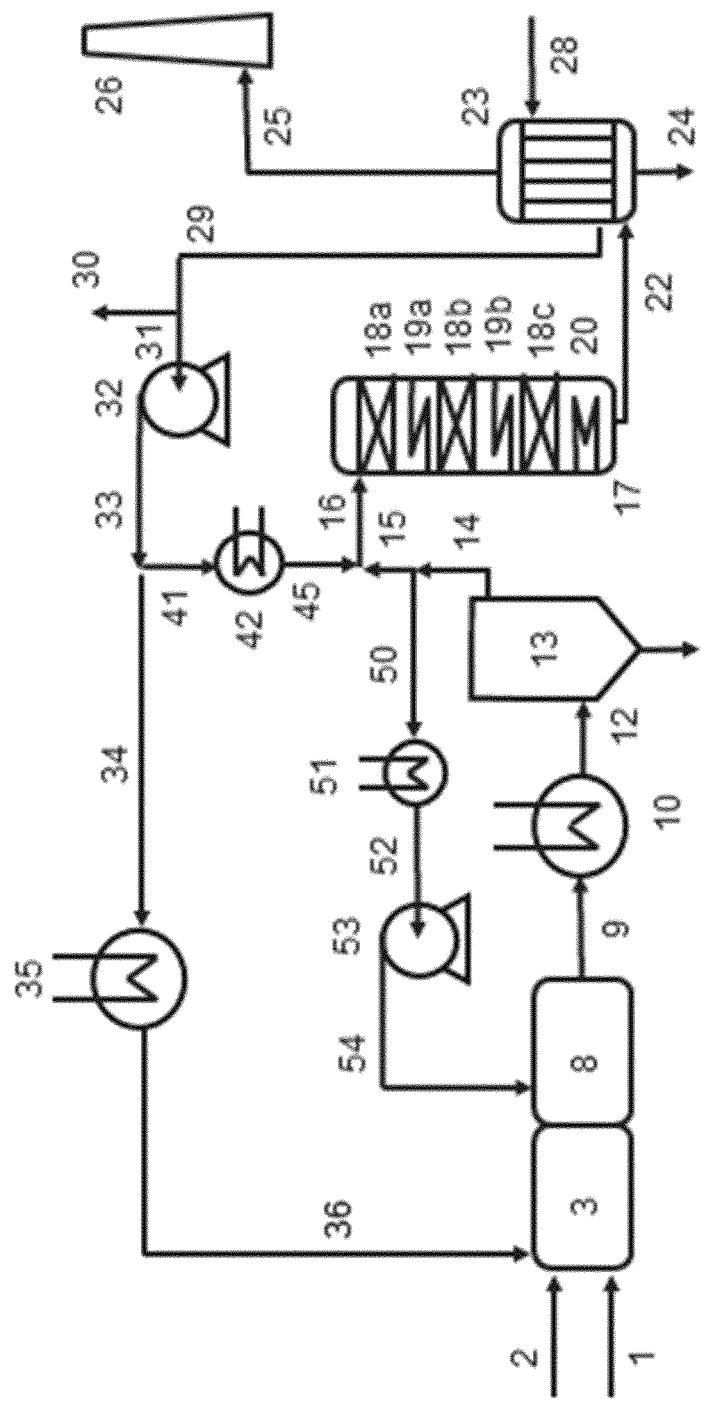

A third layout is shown in FIG. 5, in which the quenching stream 54 is process gas recycled from a position downstream the electrostatic precipitator 13.

A fraction of the process gas 14 leaving the precipitator 13 is directed to a heat exchanger 51 to cool the process gas from 400-450° C. to 200-300° C. A simple and energy efficient method consists in installing a boiler that uses the high pressure steam system used at other locations of the sulfuric acid plant, e.g. process gas cooler 20 and (partly) 10. The cooled quench gas 52 is then pressurized in quench gas blower 53 and sent to the mixing chamber 8 via line 54. With this layout no additional $O_2$ is added via the quench line and it is necessary to supply process gas line 15 with the $O_2$ needed for the $SO_2$ oxidation in the converter 17. This dilution air is hot air 29 from the sulfuric acid condenser 24, which has been pressurized in combustion air blower 32 and further heated to 350-400° C. in the dilution air heater 42. The dilution air heater will typically be located in position 10 in order to optimize heat recovery.

The advantage of this layout is a slightly better heat recovery than in the layout with hot air quench, cf. FIG. 4. Also the quench gas cooler 51 and quench gas blower 53 are installed in a dust free process gas, thus minimizing the risk of fouling of the heat exchanger and blower. The process gas flow through the plant is unchanged.

Another advantage is that the dilution air addition via line 45 reduces the dust concentration in the process gas 16 entering the $SO_2$ converter 17, which will reduce the plugging of the catalyst layers (especially 18a) due to capture of residual dust in the process gas 14 leaving the electrostatic precipitator 13. The catalyst for converting $SO_2$ to $SO_3$ is very efficient in capturing dust particles and thus over time they plug due to the filling up of the volumes between the catalyst pellets with the dust. For most electrostatic precipitators there is a minimum achievable dust emission concentration, which is independent of the size of the precipitator and the dust concentration at the inlet of the precipitator. With the layout in FIG. 5, this dust concentration at the inlet to the $SO_2$ converter 17 is equal to the conventional layout, cf. FIG. 1, whereas the layouts in FIGS. 3 and 4 have a higher dust concentration at the inlet to the $SO_2$ converter.

To prolong the operation before plugging the catalyst layer, the $SO_2$ converter can be designed with "sacrificial" catalyst layers, which can be bypassed when plugged with dust.

Figure 6:
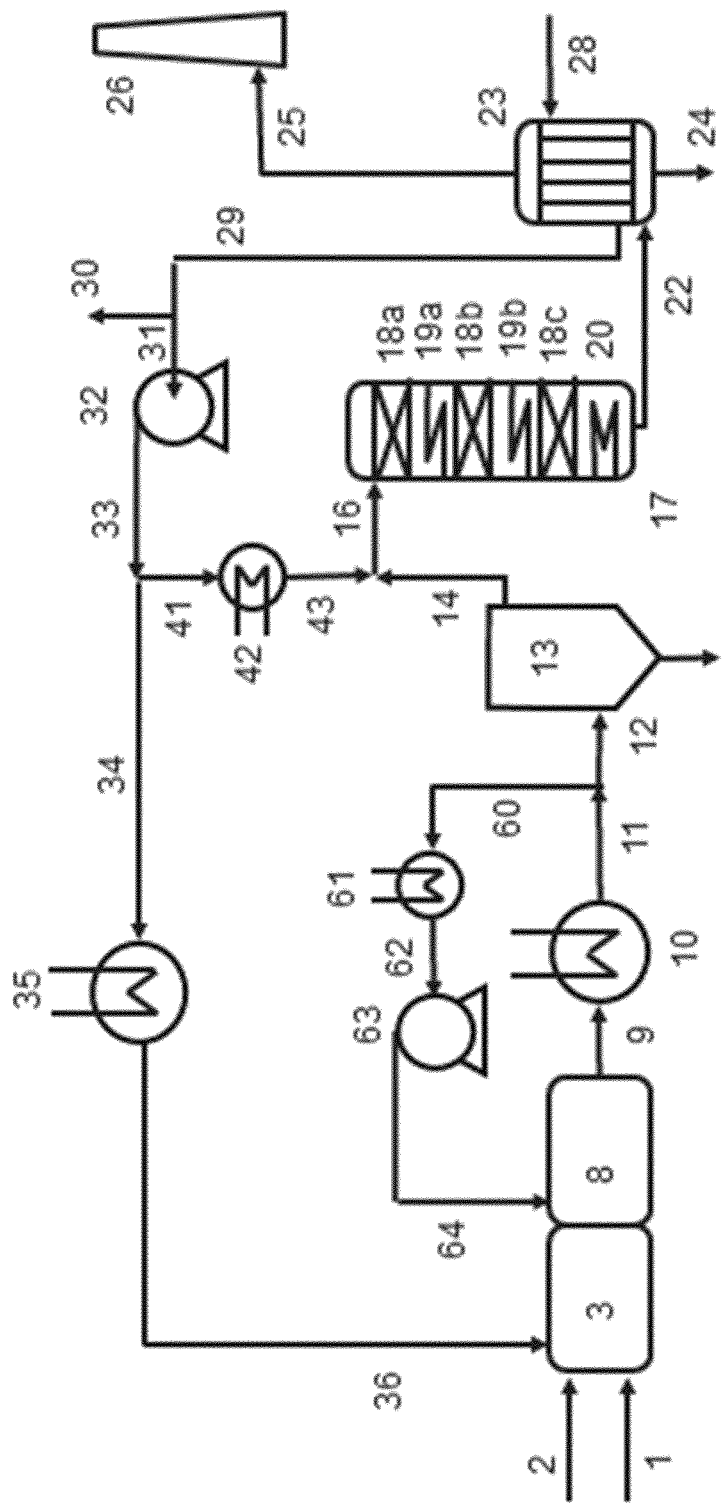

A fourth layout is shown in FIG. 6. The layout resembles the layout in FIG. 5, but the process gas to be recycled for process gas quenching 64 is withdrawn at a position upstream from the electrostatic precipitator 13. The dust laden process gas 60 is cooled in quench gas cooler 61 and pressurized in quench gas blower 63 before being fed to the mixing chamber 8 via line 64. This layout has the advantage that the process gas flow through the electrostatic precipitator is minimized, i.e. the flow through the precipitator is equal to that in the conventional layout as shown in FIG. 1. This saves on cost of the precipitator. The quench gas cooler 61 and quench gas blower 63 both have to be designed for dust in the process gas, making them a little more expensive.

Apart from these differences the total process gas flow and heat recovery is equal to the layout as in FIG. 5.

The invention is illustrated in more detail in the example which follows.

EXAMPLE

Process calculations have been carried out for the layouts shown in FIGS. 1-6, where the layouts in FIGS. 1 and 2 are equal with regard to process gas flow, composition and heat recovery.

The calculations are carried out for a sulfuric acid plant, regenerating 100 metric tons/day of spent sulfuric acid from an alkylation process. The furnace temperature is 1000° C., and the combustion air is preheated to 400° C. in every layout.

It is assumed that the dust concentration in the process gas leaving the electrostatic precipitator is 2 mg/$Nm^3$, a value that is independent of the dust concentration at the inlet of the precipitator.

Combustion air flow and fuel gas flow are equal for each layout.

The main results are shown in the table below. The table compares five different process layouts for converting 100 metric ton/day of spent sulfuric acid into concentrated sulfuric acid. The process layouts only differ from the outlet of the furnace to the inlet of the $SO_2$ converter.

It is seen that in many ways the conventional layout is the preferred layout, as much of the equipment has the lowest flow and thus has the potential for lower cost too. This is evident for the electrostatic precipitator, but not necessarily evident for the heat exchangers as the different layouts provide possibilities for different heat exchanger layouts and materials of construction.

To be able to operate without plugging of the waste heat boiler, the quench solution must be applied, but the prolonged operation time comes at a potentially higher cost and/or a lower heat efficiency of the plant.

In the table, the heat exchange duty is defined as the heat transfer from one media to another in a position between the outlet of the furnace to the inlet of the $SO_2$ converter, i.e. waste heat boiler, quench gas cooler, combustion air heater and dilution air heater. The heat exchangers in the rest of the plant are similar and not included in the comparison.

The steam export duty is defined as the heat transferred to the high pressure steam system in the entire sulfuric acid plant and is thus a measure of the heat recovery efficiency of the plant layouts. The heat recovery can be higher if e.g. the hot air from the sulfuric acid condenser, not used for combustion/quench/dilution air, can be utilized for e.g. low pressure steam production, drying purposes and district heating.

The cold air quench layout is very simple with the lowest heat exchange surface installed between the furnace and $SO_2$ converter. This is at the cost of steam export duty, but for a small plant with little use of steam, this layout could be the best solution.

Better heat recovery is achieved with the hot air quench with more heat exchange area installed.

The highest heat recovery combined with the lowest dust concentration at the inlet to the $SO_2$ converter is achieved with the process gas recycle quench. Although a bit more complicated, the layout with dust laden process gas recycle and quench will offer a solution with heat recovery very close to the standard layout, but with considerably longer operating time due to the low risk of plugging of the heat exchangers. The costs of the two solutions are comparable, with less than 10% cost difference.

|  |  | Standard layout | Cold air quench | Hot air quench | Dust free process gas quench | Dust laden process gas quench |
|---|---|---|---|---|---|---|
| Figure |  | 1 + 2 | 3 | 4 | 5 | 6 |
| Process gas in furnace | $Nm^3/h$ | 7800 | 7800 | 7800 | 7800 | 7800 |
| Quench gas flow | $Nm^3/h$ | 0 | 12200 | 11100 | 10200 | 10200 |
| Flow to heat exchangers | $Nm^3/h$ | 7800 | 20000 | 18900 | 18000 | 18000 |
| Flow to electrostatic precipitator | $Nm^3/h$ | 7800 | 20000 | 18900 | 18000 | 7800 |
| Dilution air flow | $Nm^3/h$ | 11000 | 0 | 0 | 10800 | 10800 |
| Flow to $SO_2$ converter | $Nm^3/h$ | 18800 | 20000 | 18900 | 18600 | 18600 |
| Dust concentration to SO2 converter | mg/$Nm^3$ | 0.8 | 2.0 | 2.0 | 0.8 | 0.8 |

-continued

|  |  | Standard layout | Cold air quench | Hot air quench | Dust free process gas quench | Dust laden process gas quench |
|---|---|---|---|---|---|---|
| Heat exchange duty | Index | 100 | 13 | 63 | 97 | 97 |
| Steam export duty | Index | 100 | 67 | 85 | 92 | 92 |

The invention claimed is:

1. A method for the production of sulfur trioxide from a feed stream comprising sulfur-containing compounds and dissolved metals and alkali metals, said process comprising the following steps:
   incineration in the presence of an $O_2$-rich stream and optionally a support fuel, whereby the sulfur-containing compounds in the feed stream are converted to $SO_2$ and the dissolved metals and alkali metals are converted into a partly solidified dust,
   mixing the hot process gas from the incinerator with a stream of colder gas in a mixing unit, such that the temperature of the combined stream is below the particle solidification temperature,
   cooling of the combined gas stream in one or two heat exchangers,
   removing solid dust particles from the combined gas stream in a dust removal device,
   optionally adding hot dilution air to the process gas to provide sufficient oxygen for the oxidation of $SO_2$ to $SO_3$ in an $SO_2$ converter, and
   feeding the process gas to an $SO_2$ converter consisting of a number of catalyst layers with heat exchangers installed between the catalyst layers, thereby converting the $SO_2$ in the process gas to $SO_3$.

2. Method according to claim 1, wherein the incineration temperature is around 900-1300° C. and the exit temperature from the mixing unit is in the interval of 450-700° C.

3. Method according to claim 1, wherein the temperature of all surfaces in the mixing unit, which are in contact with the process gas from the incinerator, are above the solidification temperature.

4. Method according to claim 1, wherein the temperature of the colder stream added to the mixing unit is between 25 and 350° C.

5. Method according to claim 1, wherein the heat exchanger(s) between the mixing step and the dust removal step is a waste heat boiler, a combustion air heater, a dilution air heater or any combination of those.

6. Method according to claim 1, wherein the temperature of all surfaces of the mixing unit are above the sulfuric acid dew point temperature of the process gas.

7. Method according to claim 1, wherein the inlet temperature of the catalyst layer(s) of the $SO_2$ converter is around 375-420° C.

8. Method according to claim 1, wherein the converted process gas leaving the $SO_2$ converter is cooled to around 250-310° C.

9. A plant for the production of sulfur trioxide by the method according to claim 1, said plant comprising an incineration furnace, a mixing device, a dilution air heater, a dust removal device, an $SO_2$ converter and a sulfuric acid condenser.

10. Plant according to claim 9, wherein the $SO_2$ converter consists of a number of catalyst layers with heat exchangers installed between the catalyst layers.

11. Plant according to claim 9, wherein quench air is added as atmospheric air.

12. Plant according to claim 9, wherein quench air is added as hot air from the sulfuric acid condenser.

13. Plant according to claim 9, wherein quench gas is added as process gas recycled from a position downstream from the dust removal device.

14. Plant according to claim 6, wherein the process gas for quenching is withdrawn from a position upstream from the dust removal device.

* * * * *